(12) United States Patent
Hurd

(10) Patent No.: US 8,074,057 B2
(45) Date of Patent: Dec. 6, 2011

(54) SYSTEMS AND METHODS FOR CONTROLLING INSTRUCTION THROUGHPUT

(75) Inventor: Kevin Altair Hurd, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1795 days.

(21) Appl. No.: 11/074,451

(22) Filed: Mar. 8, 2005

(65) Prior Publication Data

US 2006/0206740 A1 Sep. 14, 2006

(51) Int. Cl.
*G06F 9/00* (2006.01)
(52) U.S. Cl. ........................................ 712/220
(58) Field of Classification Search .................. None
See application file for complete search history.

(56) References Cited

U.S. PATENT DOCUMENTS

| 5,719,800 | A | * | 2/1998 | Mittal et al. ................... 713/321 |
| 5,829,879 | A | | 11/1998 | Sanchez et al. |
| 6,029,006 | A | | 2/2000 | Alexander et al. |
| 6,304,978 | B1 | | 10/2001 | Horigan et al. |
| 6,564,328 | B1 | | 5/2003 | Grochowski et al. |
| 6,636,976 | B1 | * | 10/2003 | Grochowski et al. ......... 713/320 |
| 6,651,176 | B1 | | 11/2003 | Soltis, Jr. et al. |
| 6,775,787 | B2 | | 8/2004 | Greene |
| 6,826,704 | B1 | | 11/2004 | Pickett |
| 6,931,559 | B2 | * | 8/2005 | Burns et al. ................... 713/340 |

\* cited by examiner

*Primary Examiner* — Jacob A Petranek

(57) ABSTRACT

Systems and methods for controlling instruction throughput are disclosed. One embodiment of a system may comprise a comparator that determines a difference value in an actual instructions per clock cycle throughput and a target instructions per clock cycle throughput setting, and a throttle control that sums a plurality of difference values to determine an average difference value over a plurality of clock cycles and adjusts the actual instructions per clock cycle throughput based on the average difference value.

25 Claims, 3 Drawing Sheets

SYSTEMS AND METHODS FOR CONTROLLING INSTRUCTION THROUGHPUT

BACKGROUND

Modern processors include extensive execution resources to support concurrent processing of multiple instructions. A processor typically includes one or more integer, floating point, branch, and memory execution units to implement integer, floating point, branch, and load/store instructions, respectively. In addition, integer and floating point processing units typically include register files to maintain data relatively close to the processor core. One drawback to providing a processor with extensive execution resources is that significant amounts of power are required to run them. However, few programs require the full range of a processor's execution resources for significant intervals. Cooling systems for maintaining a processor at a maximum allowable temperature and associated maximum power dissipation are designed to cool the processor at it maximum instruction throughput capacity.

DETAILED DESCRIPTION

This disclosure relates generally to systems and methods for controlling instruction throughput. The system and methods determine a difference value between a target instructions per clock cycle setting and actual instructions per clock cycle for a plurality of clock cycles. A plurality of difference values are employed to provide an average difference value that is used to adjust instruction throughput. As used herein, "instructions" denote basic processor commands, such as load and store operations, and other operations such as floating point operations. Instructions per clock cycle or instructions per cycle denote a number of instructions launched or retired in a given processor clock cycle.

Figure 1:
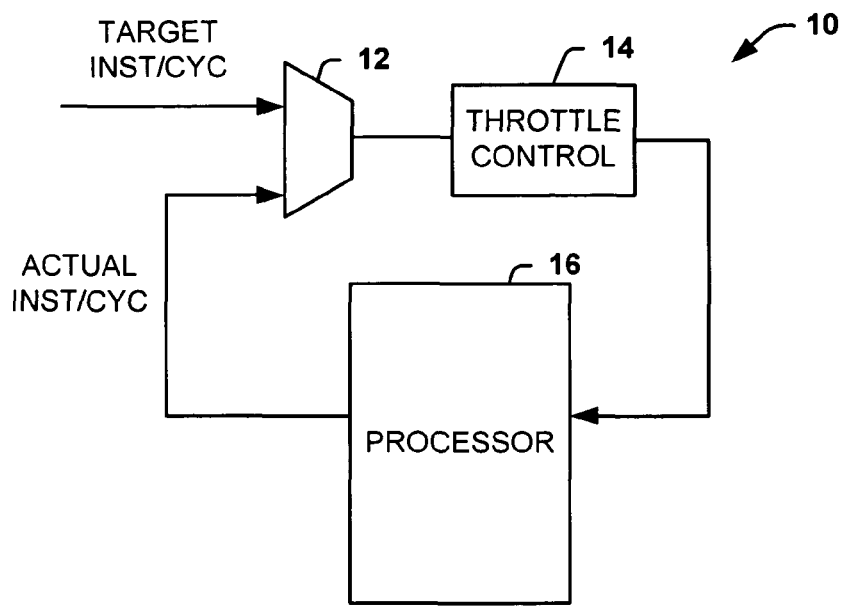
FIG. 1 illustrates a block diagram of an embodiment of a system for controlling instruction throughput.

FIG. 1 illustrates a system 10 for controlling instruction throughput. The system includes a comparator 12, a throttle control 14 and a processor 16. The comparator 12 is operative to generate a difference value between actual instructions per clock cycle throughput (ACTUAL INST/CYC) and target instructions per clock cycle throughput setting (TARGET INST/CYC). The target instructions per clock cycle throughput can be predetermined based on the specific application. For example, the processor 16 may be able to execute four instructions per clock cycle. Therefore, the system cooling capacity will be designed to maintain the processor 16 at a maximum allowable temperature based on power dissipation at an average of four instructions per clock cycle. However, in many applications the average number of instructions per clock cycle is less than the allowable instructions per clock cycle capacity of the processor 16.

The system 10 provides for a setting of a target instructions per clock cycle throughput (e.g., 1, 2 or 3 average number of instructions per cycle), and controlling the actual instructions per clock cycle throughput based on the target per clock cycle throughput setting. This allows for a variable average target power associated with the target instructions per clock cycle throughput setting based on a specific program application eliminating the need to design a cooling system (e.g., fans, baffles, heat sinks) based on a worst case power dissipation. Therefore, a reduced cost cooling system can be employed as opposed to a cooling system designed for a worst case power dissipation of the processor or the processor can operate at a lower average temperature improving reliability.

The comparator 12 provides a difference value every clock cycle to the throttle control 14. The throttle control 14 sums a plurality of difference values to determine an average difference value over a plurality of clock cycles. The average difference value corresponds to the average power difference between the actual power associated with the actual instructions per clock cycle throughput and a target power associated with the target instructions per clock cycle throughput setting. The throttle control 14 periodically provides a throttle control signal to the processor 16 for adjusting the actual instructions per clock cycle throughput based on the average difference value. The employment of adjusting instruction throughput based on an average difference value allows for the processor to operate at full instruction capacity for short periods of time.

The processor 16 can adjust the actual instruction cycle throughput by adjusting an average number of instructions that get launched over a plurality of clock cycles through one or more execution pipelines associated with the processor 16. The one or more execution pipelines can include one or more load execution units and one or more floating point processing execution units. The processor 16 can control the fetching, issuing, scheduling and/or transferring of the instruction through the one or more execution pipelines. For example, the processor 16 may be able to launch (e.g., fetch, issue, schedule, transfer) eight instructions per eight clock cycles to one or more of the execution units. However, the processor 16 can adjust the launching to seven instructions per eight clock cycles to reduce the actual average instructions per clock cycle. If the desired average instructions per clock cycle is still above the target instructions per clock cycle throughput setting, the processor 16 can adjust the launching to six instructions per eight clock cycles, to five instructions per eight clock cycle and so on in incremental reductions, until the actual average instructions per clock cycle is below the target instructions per clock cycle throughput setting. Similarly, the processor 16 can adjust the actual instruction cycle throughput by adjusting the retire rate or the number of instructions per cycle to be retired.

Figure 2:
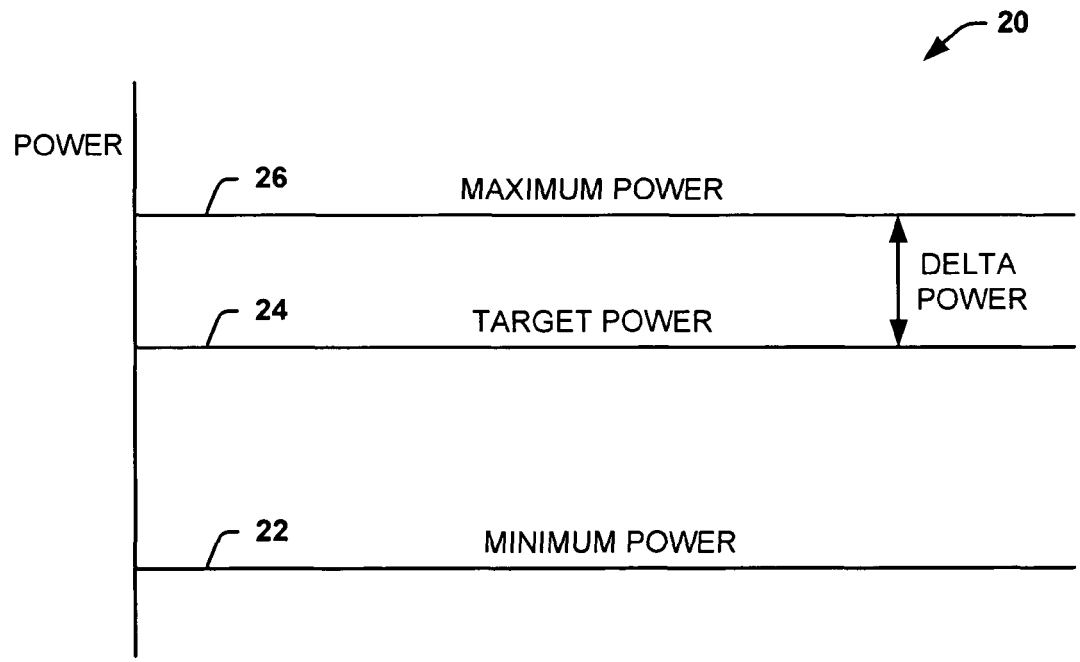
FIG. 2 illustrates a power profile that illustrates power dissipation based on instructions per clock cycle.

As previously discussed, the system 10 allows for a reduction in cooling capacity based on a reduction of processor power dissipation due to correlation between power dissipation, maximum allowable temperature and instructions per clock cycle throughput. FIG. 2 illustrates a power profile 20 that illustrates power dissipation based on instructions per clock cycle. The power profile 10 illustrates a first line 22 corresponding to a minimum power dissipation for the processor when the processor is performing a minimal amount of instructions per clock cycle. The power profile 20 illustrates a second line 26 corresponding to a maximum power dissipation for the processor when the processor is performing at its maximum capability of instructions per clock cycle. The power profile 20 illustrates a third line 24 corresponding to a target power for the processor when the processor is performing at the target instructions per clock cycle throughput.

Therefore, there is a delta power that can be determined based on the difference between the maximum power and the target power allowing for employment of a less costly cooling system, or a more reliable system that operates at a lower average temperature.

Figure 3:
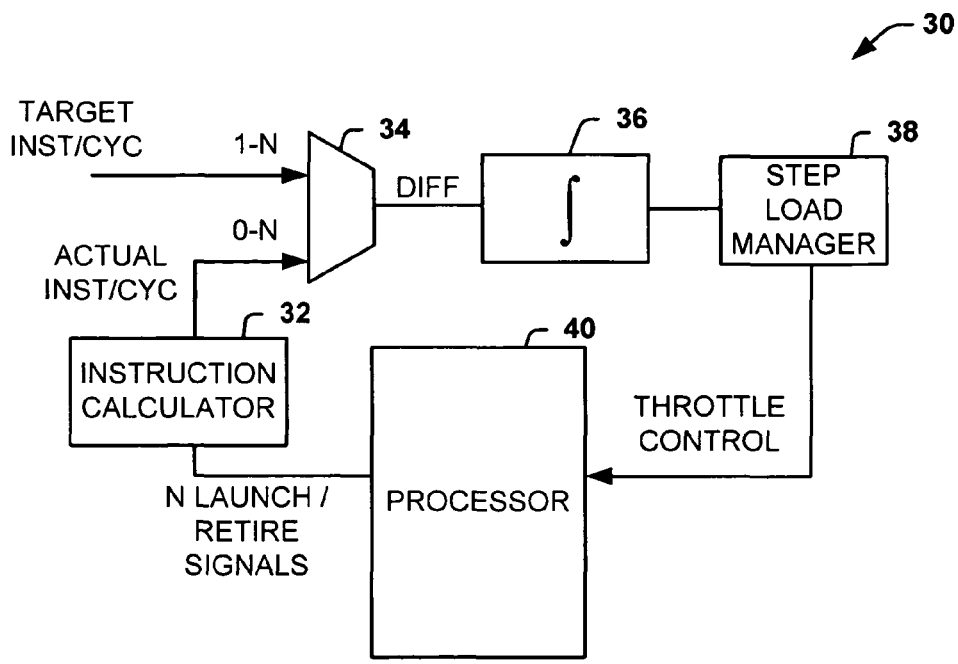
FIG. 3 illustrates a block diagram of another embodiment of a system for controlling instruction throughput.

FIG. 3 illustrates another system 30 for controlling instruction throughput. The system 30 includes an instruction calculator 32 that determines the actual instructions per clock cycle throughput for a given clock cycle. The instruction calculator 32 receives, for example, N launch signals associated with a processor 40, where N is an integer greater than one. A given launch signal can be associated with an execution unit of the processor 40. A state of a given launch signal can provide an indication of whether or not an instruction was launched through a pipeline associated with a given execution unit of the processor. For example, a zero value can be an inactive indication that an instruction was not launched through a pipeline associated with a given execution unit, while a one value can be an active indication that an instruction was launched through a pipeline associated with a given execution unit. Alternatively, the instruction calculator 32 can receive a plurality of retire signals that provide an indication of whether or not an instruction was retired at an end of a pipeline associated with a given execution unit for a given clock cycle. It is to be appreciated that controlling of instruction throughput through a processor pipeline can be achieved by either controlling instruction launching or instruction retirement.

The instruction calculator 32 determines a number of instructions that were launched based on the launch signals for a given clock cycle or that were retired based on the retire signals for a given clock cycle. The instruction calculator 32 then provides a comparator 34 with an actual instructions per clock cycle throughput value. The comparator 34 generates a difference value between actual instructions per clock cycle throughput value and target instructions per clock cycle throughput setting. The target instructions per clock cycle throughput setting can be predetermined based on a specific application and can take on a value from 1 to N. If the value selected is N, then the system 30 operates at its maximum allowable instructions per clock cycle capacity of the processor 40, such that instruction throughput control is not performed. However, if a value of 1 to N−1 is selected, the system 30 operates below its maximum allowable instruction clock cycle capacity of the processor 40 and instruction throughput control may be performed.

The comparator 34 provides a difference value every clock cycle, which is provided to an integrator 36. The integrator 36 sums a plurality of difference values to determine an average difference value over a plurality of clock cycles. The average difference value corresponds to the average power difference between the actual power associated with the actual instructions per clock cycle throughput and a target power associated with the target instructions per clock cycle throughput setting. The integrator 36 provides an average difference value to a step load manager 38 that is periodically updated, for example about every 40 to about every 60 clock cycles. The step load manager 38 periodically (e.g., about 100 to about 300 clock cycles) provides a throttle control signal to the processor 40 for adjusting the actual instructions per clock cycle throughput based on the average difference value.

The throttle control signal instructs the processor 40 to one of maintain instruction throughput, step up instruction throughput or step down instruction throughput. The processor 40 responds by maintaining instruction throughput, stepping down instruction throughput or stepping up instruction throughput. For example, if one or more of the execution units are operating at six instructions per eight clock cycles, the processor 40 will step down to five instructions per eight clock cycles for the one or more execution units in response to a step down instruction. If the average actual instruction throughput is still above the target instruction throughput, the integrator 36 and step load manager 38 will update and send a subsequent step down instruction. The processor 40 will step down to four instructions per eight clock cycles for the one or more execution units in response to a step down instruction. This process will repeat until the average actual instruction throughput is below the target instruction throughput setting.

Alternatively, if the actual instruction throughput is below the target instruction throughput setting by a predetermined average instructions per cycle amount, the step load manager 38 will provide the processor 40 with a step up instruction. For example, if one or more of the execution units are operating at six instructions per eight clock cycles, the processor will step up to seven instructions per eight clock cycles for the one or more execution units in response to a step up instruction. If the average actual instruction throughput is still below the target instruction throughput setting by the predetermined average instruction cycle amount, the integrator 36 and step load manager 38 will update and send a subsequent step up instruction. The processor 40 will step up to eight instructions per eight clock cycles for the one or more execution units in response to a step up instruction.

Figure 4:
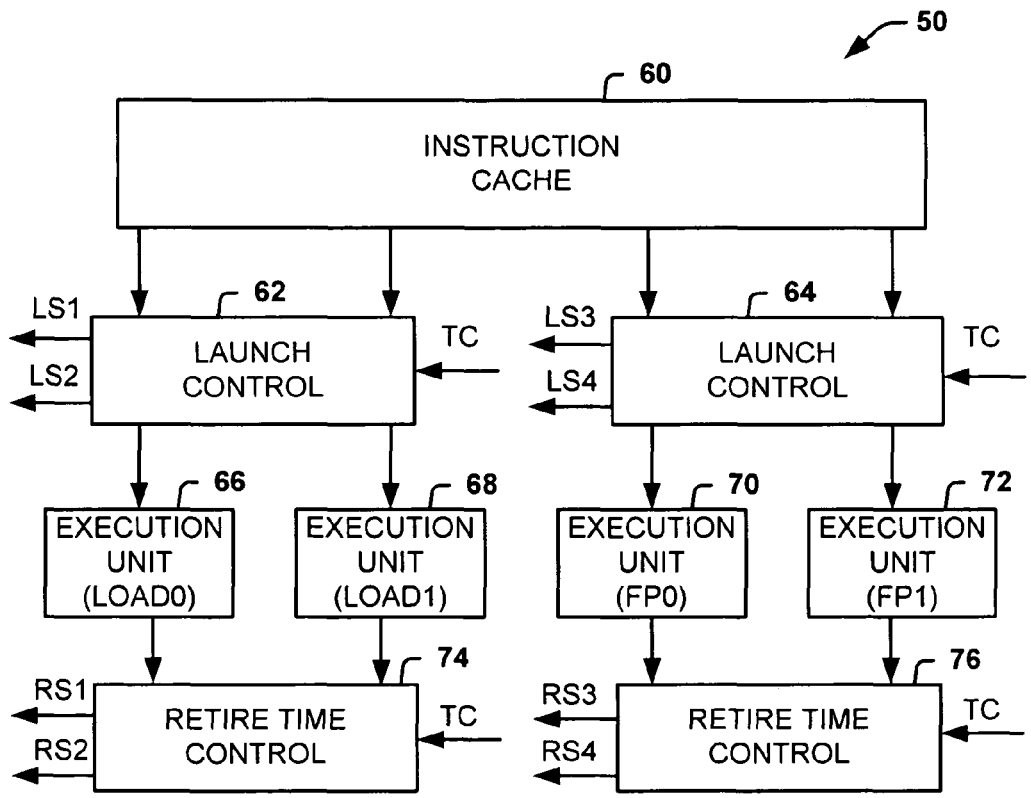
FIG. 4 illustrates an embodiment of an instruction throughput portion of a processor.

FIG. 4 illustrates an exemplary instruction throughput portion 50 of a processor. The instruction throughput portion 50 includes a first launch control 62 and a first retire time control 74 associated with a first load execution unit 66 (LOAD0) and a second load execution unit 68 (LOAD1). The instruction throughput portion 50 includes a second launch control 64 and a second retire time control 76 associated with a first floating point execution unit 70 (FP0) and a second floating point execution unit 72 (FP1). The first launch control 62, the first retire time control 74 and the first load execution unit 66 form a first instruction pipeline, and the first launch control 62, the first retire time control 74 and the second load execution unit 68 form a second instruction pipeline. The second launch control 64, the second retire time control 76 and the first floating point execution unit 70 form a third instruction pipeline, and the second launch control 64, the second retire time control 76 and the second floating point execution unit 72 form a fourth instruction pipeline. Therefore, the instruction throughput portion 50 includes four instruction pipelines and is capable of executing four instructions per clock cycle.

The first and second launch control 62 and 64 can include control associated with fetching instructions from an instruction cache 60, scheduling instructions to be executed, issuing instructions and transferring instructions through an associated pipeline via transfer registers to a given execution unit. One or more of the fetch control, the schedule control, the issue control and transfer control associated with the first and second launch control 62 and 64 can be operative to adjust the instruction throughput through one or more of the respective pipelines associated with a given execution unit based on a throttle control signal (TC). The first and second launch control 62 and 64 can generate launch signals (LS1-LS4) every clock cycle that provide an indication of whether or not an instruction was launched through a respective pipeline. As previously mentioned, the launch control signals can have an active one state if an instruction was launched for a given pipeline in a given clock cycle, and an inactive zero state if an instruction was not launched for a given pipeline for the given clock cycle.

The first and second retire time control 74 and 76 can include control associated with retiring instruction from an associated pipeline. The first and second retire time control 74 and 76 can be operative to adjust the instruction throughput through one or more of the respective pipelines associated with a given execution unit based on a throttle control signal (TC) by controlling the retiring of instructions through respective pipelines. The first and second retire time control 74 and 76 can generate retire signals (RS1-RS4) every clock cycle that provide an indication of whether or not an instruction was retired from a respective pipeline. The retire signal can have an active one state if an instruction was retired for a given pipeline in a given clock cycle, and an inactive zero state if an instruction was not retired for a given pipeline for the given clock cycle.

Figure 5:
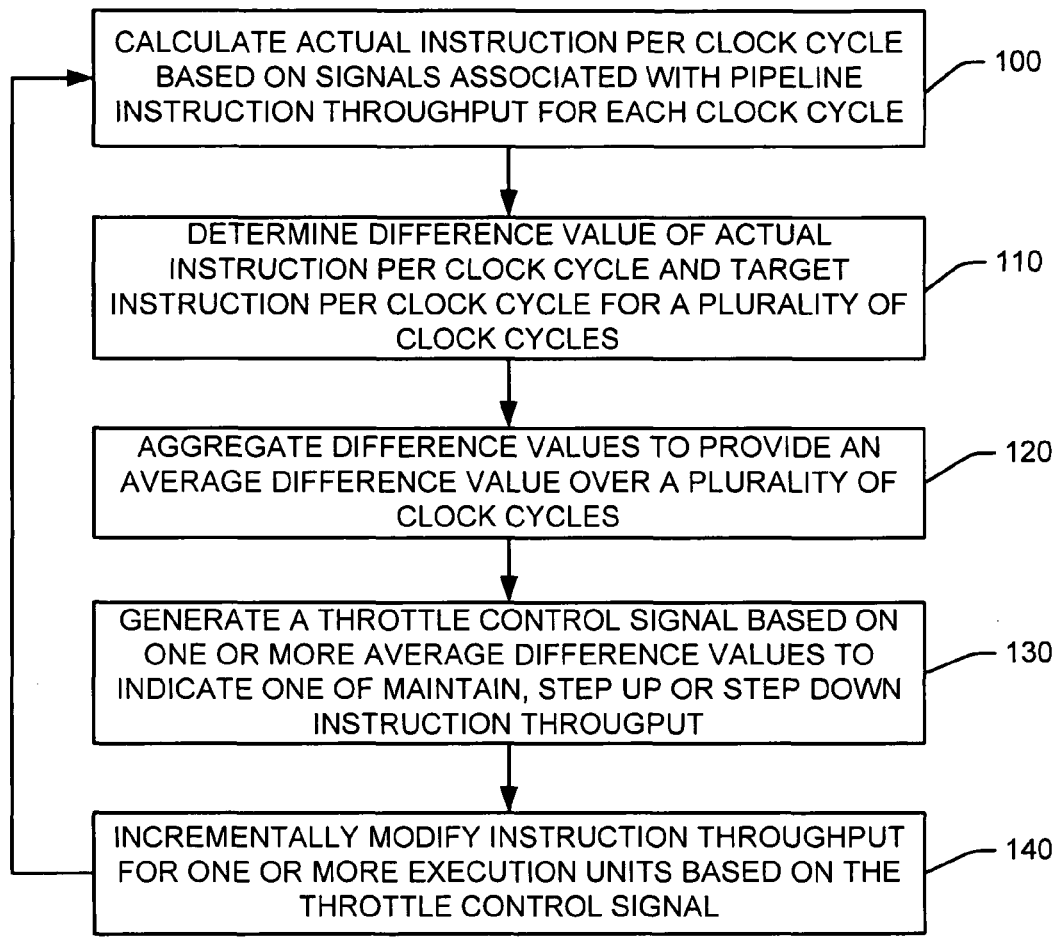
FIG. 5 illustrates an embodiment of a methodology for controlling instruction throughput.
Figure 6:
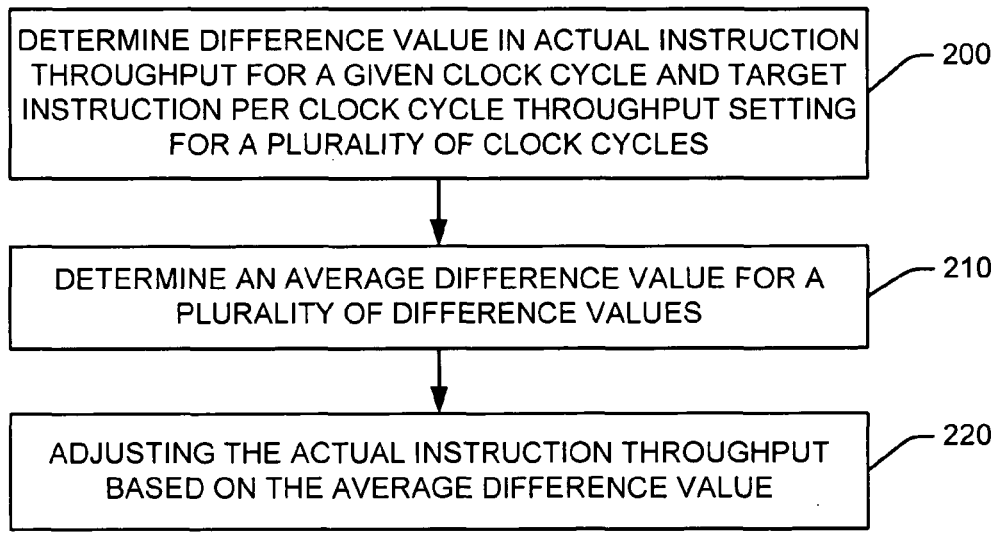
FIG. 6 illustrates another embodiment of methodology for controlling instruction throughput.

In view of the foregoing structural and functional features described above, certain methods will be better appreciated with reference to FIGS. 5-6. It is to be understood and appreciated that the illustrated actions, in other embodiments, may occur in different orders and/or concurrently with other actions. Moreover, not all illustrated features may be required to implement a method.

FIG. 5 illustrates a methodology for controlling instruction throughput. At 100, the actual instructions per clock cycle are calculated based on signals associated with pipeline instruction throughput for each clock cycle. For example, the signals can be launch signals associated with each of a plurality of pipelines or retire signals associated with each of a plurality of pipelines. A one state can indicate that an instruction launch or retire was performed at a pipeline associated with a given execution unit, while a zero state can indicate that an instruction launch or retire was not performed at a pipeline associated with a given execution unit. Therefore the actual instructions per clock cycle for a given clock cycle can be determine by adding up the number of one states. The methodology proceeds to 110. At 110, a difference value is determined between the actual instructions per clock cycle and a target instructions per clock cycle setting for a plurality of clock cycles to provide a plurality of difference values. At 120, the plurality of difference values are aggregated to provide an average difference value over a plurality of clock cycles. The methodology then proceeds to 130.

At 130, a throttle control signal is generated based on one or more average difference values to indicate one of maintain, step up or step down instruction throughput. At 140, instruction throughput is incrementally modified for one or more execution units based on the throttle control signal. For example, instruction throughput through floating point execution units can be modified by incrementally stepping down or up the average number of instructions per clock cycle for one or more floating point execution units, such that instructions are not launched or retired for more or less cycles over a set number of clock cycles. The methodology then returns to 100 to repeat block 100-140.

FIG. 6 illustrates another methodology for controlling instruction throughput. At 200, a difference value is determined in actual instructions throughput for a given clock cycle and a target instructions per clock cycle throughput setting for a plurality of clock cycles. At 210, an average difference value is determined for a plurality of difference values. At 220, the actual instruction throughput is adjusted based on the average difference value.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for controlling instruction throughput of a processor, the system comprising:
a comparator that determines a difference value in an actual instructions per clock cycle throughput and a target instructions per clock cycle throughput setting; and
a throttle control that sums a plurality of difference values to determine an average difference value over a plurality of clock cycles and adjusts the actual instructions per clock cycle throughput based on the average difference value.

2. The system of claim 1, wherein the actual instructions per clock cycle throughput is a number of actual instructions launched for a given clock cycle.

3. The system of claim 2, further comprising an instruction calculator that adds a number of active launch signals for a given clock cycle to determine a number of actual instructions launched for the given clock cycle.

4. The system of claim 1, wherein the throttle control comprises an integrator that sums the plurality of difference values to provide an average difference value, and a step load manager that generates a throttle control signal to the processor to one of maintain, step up and step down actual instructions per clock cycle throughput based on at least one average difference value.

5. The system of claim 4, wherein the processor comprises a plurality of pipelines with associated execution units, the processor incrementally controlling the average instructions per clock cycle for at least one associated execution unit in response to the throttle control signal.

6. The system of claim 1, wherein the processor comprises a first launch control associated with at least one load execution unit and a second launch control associated with at least one floating point processing unit, the throttle control generating a throttle control signal that adjusts a number of instructions launched over a plurality of clock cycles by at least one of the first launch control and the second launch control.

7. The system of claim 6, wherein at least one of the first launch control and second launch control comprising control associated with at least one of fetching, scheduling, issuing and transfer instructions through an associated pipeline for controlling the actual instructions per cycle throughput based on a throttle control signal provided by the throttle control.

8. The system of claim 1, wherein the processor comprises a launch control associated with a first floating point processing unit and a second floating point processing unit, the throttle control generating a throttle control signal that adjusts a number of instructions launched over a plurality of clock cycles by the launch control to the first floating point processing unit and the second floating point processing unit.

9. The system of claim 1, wherein the processor comprises at least one retirement control that controls retirement of instructions associated with at least one execution unit, wherein the retirement control adjusts an average actual instructions per clock cycle throughput over a plurality of clock cycles by controlling retirement of instructions associated with at least one execution unit.

10. The system of claim 1, further comprising an instruction calculator that adds a number of active retire signals for a given clock cycle to determine actual instructions retired for the given clock cycle.

11. A system comprising:
a processor having a plurality of instruction pipelines;

an instruction throughput control for controlling instruction throughput through at least one of the plurality of instruction pipelines;

an instruction calculator that determines actual instruction throughput for a given clock cycle;

a comparator that determines a difference value for the actual instruction throughput and a target instructions per clock cycle throughput setting for a given clock cycle for a plurality of clock cycles; and a throttle control that determines an average difference value over a plurality of difference values and provides a throttle control signal to the instruction throughput control to adjust actual instruction throughput based on the average difference value.

12. The system of claim 11, wherein the instruction throughput control generates launch signals associated with each of the plurality of pipelines, the launch signals having a first state indicating that an instruction was launched through a given pipeline and a second state indicating that an instruction was not launched through a given pipeline, wherein the instruction calculator determines actual instruction throughput by summing up the number of launch signals in the first state for a given clock cycle.

13. The system of claim 11, wherein the throttle control comprises an integrator that sums the plurality of difference values to periodically provide an average difference value, and a step load manager that generates the throttle control signal to the instruction throughput control to adjust the actual instructions throughput by one of maintaining, stepping up and stepping down an average number of instruction per cycle through at least one of the plurality of pipelines based on at least one average difference value.

14. The system of claim 11, wherein the plurality of pipelines include associated execution units, the instruction throughput control incrementally controlling the average instructions per clock cycle for at least one associated execution unit in response to the throttle control signal.

15. The system of claim 11, wherein the instruction throughput control adjusts a number of instructions launched over a plurality of clock cycles to a first floating point processing unit and a second floating point processing unit.

16. The system of claim 11, wherein the instruction throughput control adjusts an average actual instructions per clock cycle throughput over a plurality of clock cycles by controlling retirement of instructions associated with at least one of the plurality of instruction pipelines.

17. A system for controlling instruction throughput of a multiple pipeline processor, the system comprising:

means for calculating an actual number of instructions throughput for a given clock cycle;

means for determining a difference value based on the actual number of instructions throughput for a given clock cycle and a target instructions per clock cycle throughput setting;

means for aggregating a plurality of difference values associated with a plurality of clock cycles to determine an average difference value;

means for generating a control signal associated with at least one average difference value; and means for adjusting instruction throughput through at least one pipeline based on the control signal.

18. The system of claim 17, wherein the means for adjusting instruction throughput comprising means for adjusting an average number of instructions to be launched through the at least one pipeline.

19. The system of claim 17, wherein the means for adjusting instruction throughput comprising means for adjusting an average number of instructions to be retired from the at least one pipeline.

20. The system of claim 17, wherein the means for calculating an actual number of instructions throughput for a given clock cycle adds a number of active signals associated with actual instruction throughput for a given clock cycle.

21. A method for controlling instruction throughput of a processor, the method comprising:

determining a difference value in actual instructions throughput for a given clock cycle and a target instructions per clock cycle throughput setting for a plurality of clock cycles;

determining an average difference value for a plurality of difference values; and adjusting the actual instructions throughput based on the average difference value.

22. The method of claim 21, further comprising calculating a number of instruction throughput through a plurality of pipelines associated with the processor to determine actual instruction throughput for a given clock cycle.

23. The method of claim 22, wherein the calculating a number of instruction throughput comprises adding a number of active launch signals for a given clock cycle.

24. The method of claim 22, wherein the calculating a number of instruction throughput comprises adding a number of active retire signals for a given clock cycle.

25. The method of claim 22, wherein the adjusting the actual instruction throughput based on the average difference value comprises:

generating a throttle signal based on the average difference value, the throttle signal providing an indication to one of maintain, step up and step down instruction throughput; and modifying actual instruction throughput by incrementally modifying an average number of instruction throughput for a plurality of clock cycles through at least one processor pipeline of a plurality of processor pipelines.

* * * * *